US012785405B2

(12) United States Patent
Dubsky et al.

(10) Patent No.: US 12,785,405 B2
(45) Date of Patent: Nov. 3, 2026

(54) METHOD OF OPERATING A MICROGRID

(71) Applicant: Siemens Energy Global GmbH & Co. KG, Munich (DE)

(72) Inventors: Torsten Dubsky, Mainz (DE); Wolfgang Wiesenmüller, Fürth (DE); Christian Hermsdorf, Langensendelbach (DE); Florian Bauer, Alzenau (DE); Jerzy Zablocki, Hasselroth-Gondsroth (DE); Thomas Wich, Alzenau (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 310 days.

(21) Appl. No.: 18/714,176

(22) PCT Filed: Nov. 25, 2022

(86) PCT No.: PCT/EP2022/083253
§ 371 (c)(1),
(2) Date: May 29, 2024

(87) PCT Pub. No.: WO2023/104543
PCT Pub. Date: Jun. 15, 2023

(65) Prior Publication Data
US 2025/0038539 A1 Jan. 30, 2025

(30) Foreign Application Priority Data
Dec. 10, 2021 (EP) .................................... 21213693
Apr. 21, 2022 (EP) .................................... 22169271

(51) Int. Cl.
*H02J 3/38* (2026.01)
*H02J 3/14* (2026.01)
(Continued)

(52) U.S. Cl.
CPC ................ *H02J 3/381* (2013.01); *H02J 3/14* (2013.01); *H02J 2101/20* (2026.01); *H02J 2105/51* (2026.01)

(58) Field of Classification Search
CPC .......... H02J 3/381; H02J 3/14; H02J 2101/20; H02J 2105/51
See application file for complete search history.

(56) References Cited

U.S. PATENT DOCUMENTS 7,514,808 B2 4/2009 Wobben
7,737,578 B2 6/2010 Dengel et al.
(Continued)

FOREIGN PATENT DOCUMENTS

CN 106655265 A 5/2017
JP 2020028198 A 2/2020
(Continued)

OTHER PUBLICATIONS

International Preliminary Report of Patentability (IPRP); International Application No. ; International Filing Date: Nov. 25, 2022; Date of mailing: Dec. 10, 2021; 38 pages.
(Continued)

*Primary Examiner* — Chad G Erdman
(74) *Attorney, Agent, or Firm* — Cantor Colburn LLP; Milena Gergova

(57) ABSTRACT

A method of operating a microgrid includes operating one of a plurality of power sources to deliver power to the microgrid. The method also includes measuring a quantity of power delivered to the microgrid, drawing power from the microgrid to power one of a plurality of loads, each load including a plurality of separately operable subsystems, and calculating an automation level and a production change capability for each load and subsystem of the plurality of subsystems. The method also includes measuring a quantity
(Continued)

of power drawn from the microgrid and reducing the quantity of power drawn from the microgrid in response to a measured quantity of power drawn exceeding a measured quantity of power provided.

13 Claims, 4 Drawing Sheets

(51) Int. Cl.
*H02J 101/20* (2026.01)
*H02J 105/50* (2026.01)

(56) References Cited

U.S. PATENT DOCUMENTS

2010/0274407 A1 10/2010 Creed
2017/0331325 A1 11/2017 Ristau
2018/0356782 A1* 12/2018 ElBsat .................. G05B 15/02
2020/0235580 A1 7/2020 Mcdonnell

FOREIGN PATENT DOCUMENTS

WO 2006032685 A1 3/2006
WO 2006072576 A1 7/2006
WO WO-2018164647 A1 * 9/2018 .............. H02J 3/381
WO 2023104543 A1 6/2023

OTHER PUBLICATIONS

International Search Report; International Application No. PCT/EP2022/083253; International Filing Date: Nov. 25, 2022; Date of mailing: Jan. 10, 2023 ; 16 pages.
Chinese Office Action; Application No. 2022800816832; Filing Date: Nov. 25, 2022; Date of mailing: Jan. 4, 2025; 18 pages.

* cited by examiner

METHOD OF OPERATING A MICROGRID

BACKGROUND

The invention relates to a method for the stable operation of an electrically isolated microgrid. The electrically isolated microgrid comprises one or more power sources and one or more loads with subsystems.

Many green energy sources (e.g., solar or wind power) are highly volatile meaning that the quantity of power they deliver is variable. Without a suitable approach for matching generation and consumption under these difficult boundary conditions, it is more likely that unwanted tripping or disconnection of loads, as well as power sources, may occur. Currently, one solution for this problem is to operate only in areas where a proper electrical infrastructure is available to meet the energy demand of such an industry. This solution limits the possibility to utilize the full potential of renewable energy for green production available at many remote locations around the globe where the best conditions for the generation of renewable energy may exist.

Currently, there is a significant unused potential of renewable energy which is not being fed into existing electrical grids. This available power could be leveraged to produce green hydrogen, methanol, ammonia, e-fuels, or equivalent on a large scale which would provide a significant contribution to drive the energy transition forward.

SUMMARY

In one aspect, a method of operating a microgrid includes operating one of a plurality of power sources to deliver power to the microgrid. The method also includes measuring a quantity of power delivered to the microgrid, drawing power from the microgrid to power one of a plurality of loads, each load including a plurality of separately operable subsystems, and calculating an automation level and a production change capability for each load and subsystem of the plurality of subsystems. The method also includes measuring a quantity of power drawn from the microgrid and reducing the quantity of power drawn from the microgrid in response to a measured quantity of power drawn exceeding a measured quantity of power provided. The reducing step follows a sequence of reductions which includes reducing an operating level of a first load of the plurality of loads, determining that the reduction in operating level was insufficient to reduce the measured quantity of power drawn from the microgrid to a point at or below the measured quantity of power provided, and limiting the power consumption of a first subsystem below the reduced operating level in response to the determining step concluding the reducing step did not sufficiently reduce the quantity of power drawn from the microgrid. The first subsystem is selected based in part on the calculated automation level and the production change capability.

The method may also include determining that the limiting step failed to reduce the measured quantity of power drawn from the microgrid to the point at or below the measured quantity of power provided; and transitioning one of the first subsystem and a second subsystem to a standby mode, the first subsystem and the second subsystem selected based in part on the calculated automation level and the production change capability.

The method may also include additionally determining that the transitioning step failed to reduce the measured quantity of power drawn from the microgrid to the point at or below the measured quantity of power provided; and shutting down operation of one of the first subsystem, the second subsystem, and a third subsystem, the first subsystem, the second subsystem, and the third subsystem selected based in part on the calculated automation level and the production change capability.

The method may also include determining a green coefficient for each power source of the plurality of power sources and increasing a first quantity of power delivered to the microgrid from a first power source, the first power source selected in part based on the green coefficient.

The method may also include operating a first load of the plurality of loads to produce a first product, storing the first product in a first buffer, delivering the first product from the first buffer to a second load of the plurality of loads, operating the second load to produce a second product in response to the receipt of the first product.

The method may also include a microgrid controller operable to control each of the plurality of power sources and the plurality of loads.

The method may also include operating the first load and the second load at a first load point at which a first quantity of the first product produced by the first load equals a second quantity of the first product required by the second load.

The method may also include reducing the power consumed by the first load from the first load point to a second load point while maintaining the power consumed by the second load at the first point, the second load-receiving receiving a portion of the first product from the first load and a second portion of the first product from the first buffer.

The method may operate with systems where the first load is one of a demineralized water plant, an electrolyzer, a direct air capture plant, and a methanol synthesis plant and the second load is one of the electrolyzer, a direct air capture plant, the methanol synthesis plant, and a methanol to gasoline plant.

The method may also operate with systems where the first buffer is one of a demineralized water tank, a steam tank, a hydrogen tank, a $CO_2$ tank and a methanol tank.

Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
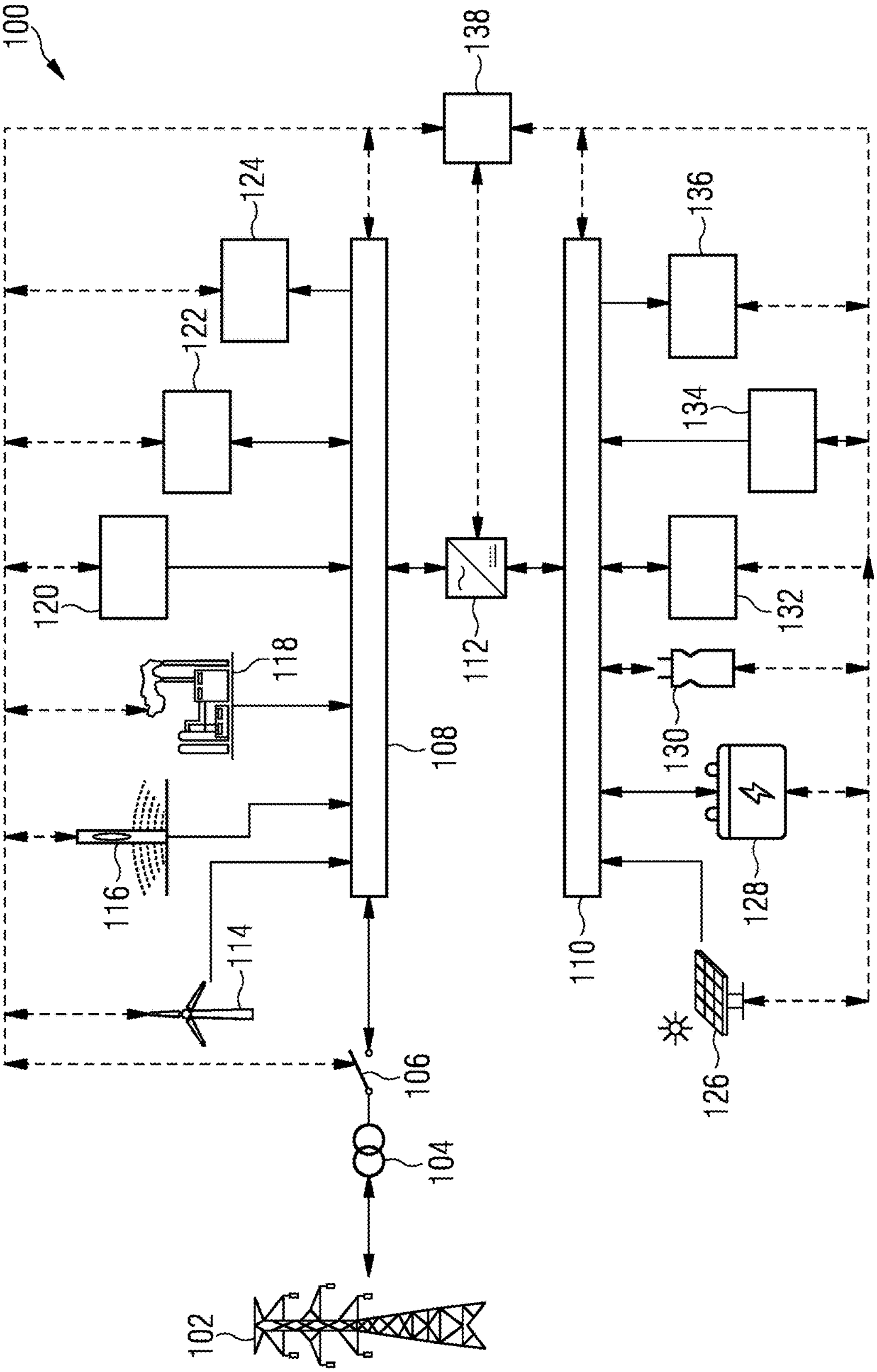
FIG. 1 is a schematic illustration of an arrangement of a microgrid.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 illustrates one possible arrangement of a microgrid 100. Before proceeding, it should be noted that the microgrid 100 illustrated in FIG. 1 includes a number of features that may be omitted in other microgrid arrangements. In addition, other microgrids may include additional features not illustrated in FIG. 1 or described herein. Additional components could include components such as transformers, switches, electrical conditioning components, sensors, controllers, and other components that may add to the operation and functionality of the system. As such, microgrids should not be limited to the arrangement of the microgrid 100 of FIG. 1.

With reference to FIG. 1, the microgrid 100 includes an AC bus 108 (alternating current bus), a DC bus 110 (direct current bus), and a microgrid controller 138. Some constructions of the microgrid 100 may also include a grid connector 106 that operates to selectively connect or disconnect the microgrid 100 from a transformer 104 that ultimately connects to a local energy grid 102, such as a utility grid.

The AC bus 108 provides a common connection point for the collection and distribution of alternating current (AC) electrical power. In constructions that include a grid connector 106, the AC bus 108 also connects to the local energy grid 102 when the grid connector 106 is in a closed position to either deliver electrical power to the local energy grid 102 or to draw electrical power from the local energy grid 102 as may be required. The DC bus 110 is similar to the AC bus 108 and provides a common connection point for the collection and distribution of direct current (DC) electrical power. It should be noted that one of the AC bus 108 or the DC bus 110 could be omitted in other microgrid systems.

An AC/DC converter 112 is provided to facilitate the transfer of power between the AC bus 108 and the DC bus 110. The AC/DC converter 112 may include one or more inverters that operate to convert DC power to suitable AC power for addition to the AC bus 108. One or more rectifiers may also be included to convert AC power from the AC bus 108 to DC power for delivery to the DC bus 110. In systems that do not include both the AC bus 108 and the DC bus 110, one or more AC/DC converters 112 could be included to allow the connection of both AC systems and DC systems to the microgrid 100.

Any number of power sources, systems, and components can be connected to the AC bus 108 to either deliver power to the AC bus 108 or to extract power from the AC bus 108. The microgrid 100 of FIG. 1 includes a wind park 114, a concentrated solar generator 116, and a combustion turbine 118 connected to the AC bus 108, with each operable to deliver power to the AC bus 108.

The wind park 114 includes one or more separate turbines that operate to generate AC power in response to the wind. The power generated by each wind turbine 114 may be AC power or DC power but that power is ultimately delivered to the AC bus 108 as AC power. As is well-known in the art, power generated by wind turbines 114 can be classified as both a green energy source as well as a variable or volatile energy source as it relies on proper wind conditions to be capable of generating energy, and the amount generated varies with the wind conditions.

The concentrated solar generator 116 includes one or more plants that operate to concentrate solar energy to generate steam. The steam in turn powers a conventional steam turbine to generate AC power that can be delivered directly to the AC bus 108. Like the power delivered by the wind park 114, the power delivered by the concentrated solar generator 116 can be classified as both a green energy source as well as a variable energy source as it relies on access to sunshine to be capable of generating energy, and the amount generated varies with the level of sunshine.

The combustion turbine 118 may include one or more combustion turbines 118 that combust a fuel to produce AC power that can be delivered directly to the AC bus 108. Power delivered by the combustion turbines 118 can be classified as green or not green depending upon the fuel combusted. For example, a combustion turbine 118 that combusts hydrogen or methane from biomass would generally be considered green so long as the source of hydrogen or biomass is green. In addition, other sources of methane can be considered green such that combustion turbines 118 that combust green methane could be considered green. Unlike wind turbines 114 and concentrated solar generators 116, combustion turbines 118 are not considered variable energy sources as they are capable of delivering full power regardless of external conditions, so long as they have a fuel supply.

The wind park 114, the concentrated solar generator 116, and the combustion turbine 118 are examples of power sources suitable for use in the microgrid 100. However, other AC electrical generators 120 are also suitable for use with the microgrid 100 and in particular for connection with the AC bus 108. The additional AC electrical generators 120 may be variable and may also be green. For example, additional AC electrical generators 120 could include generators powered by hydro, geothermal, nuclear, fossil fuels, tidal, and the like. It is also important to note that many of these power sources are capable of controlling the frequency and voltage of the AC power delivered to the AC bus 108, thereby adding to the stability of the microgrid 100.

In addition to power sources, AC energy storage systems 122 or power conditioning systems may also be connected to the AC bus 108. AC energy storage systems 122 include systems that use AC power to store energy, typically in another form, when that energy is abundant and then use that stored energy to generate AC power when additional AC power is required by the AC bus 108. One example of an AC energy storage system 122 is pumped storage hydro in which water is pumped to a higher elevation when excess energy is available, and the water is passed through a hydro turbine when AC power is required. Another AC energy storage system 122 includes a compressed gas storage system that operates to compress a gas with excess energy and then power a turbine or other device using that compressed gas to generate AC power when energy is needed. Power conditioning systems could include synchronous condensers or flywheels that operate to control reactive power and fast frequency response in some cases (e.g., spinning reserve).

Another energy storage system could include a production facility that uses excess energy to produce hydrogen, methane, gasoline, or other compounds that efficiently store energy. With a hydrogen facility, excess electricity is used in an electrolysis process to produce hydrogen. The hydrogen is then pressurized and stored. When additional AC power is required, the stored hydrogen is used as fuel in the combustion turbine 118. Many other AC energy storage systems 122 are suitable for use with the AC bus 108. As such, the microgrid 100 should not be limited to those examples discussed herein.

Also attached to the AC bus 108 are one or more AC loads 124. AC loads 124 are loads that do not provide power to the AC bus 108 but rather only draw AC power. AC loads 124 can include factories, homes, data storage systems, production facilities, and the like.

Like the AC bus 108, any number of systems and components can be connected to the DC bus 110 to either deliver power to the DC bus 110 or to extract power from the DC bus 110. For example, the microgrid 100 of FIG. 1 includes a PV solar generator 126 connected to the DC bus 110 to deliver DC power to the DC bus 110. Power delivered by the PV solar generator 126 can be classified as both a green energy source as well as a variable energy source as it relies on access to sunshine to be capable of generating energy, and the amount generated varies with the level of sunshine.

Other DC electrical generators 134 may also be connected to the DC bus 110 to deliver DC power to the DC bus 110. For example, fuel cells could be connected to the DC bus 110 to deliver power to the DC bus 110. Many other DC power sources could also be employed such as but not limited to DC generators, alternators, and other variable frequency sources that include a rectifier.

The DC bus 110 is well-suited to supporting many energy storage devices including batteries 128, ultracapacitors 130, and other DC energy storage systems 132. Batteries 128 and ultracapacitors 130 are well-known energy storage devices with virtually any type and arrangement being suitable for use with the microgrid 100 of FIG. 1. Other DC energy storage systems 132 could include flywheels, electrochemical capacitors, thermal storage, and the like.

One or more DC loads 136 may be connected to the DC bus 110 to draw DC power therefrom. Unlike energy storage devices that can transfer power to and from the DC bus 110, DC loads 136 only draw power from the DC bus 110. DC loads 136 could include heating systems, data centers, computers, or any other system or component that operates on or consumes DC power.

It should be noted that any AC system including loads, power-producing, systems, and storage systems could be converted to DC systems using one or more rectifiers. Similarly, any DC system could be converted to AC with one or more inverters. As such, the examples provided herein should not be limited to connection to the AC bus 108 or the DC bus 110 as described herein.

The microgrid controller 138 is typically a microprocessor-based controller that includes a microprocessor, memory, a memory storage device, input devices, and some form of output such as a display that allows for user interaction. Of course, other controllers or arrangements of controllers could be employed. It is also important to note that while FIG. 1 illustrates a single microgrid controller 138, multiple components or systems could be distributed throughout the microgrid 100 and could cooperate with one another to perform the functions of the microgrid controller 138.

The microgrid controller 138 communicates with the various components of the microgrid 100 to monitor and/or control their operation. The microgrid controller 138 may include sensors that monitor temperatures, pressures, power flow, valve positions, switch and relay positions, voltage, frequency, and the like to operate the microgrid 100. The microgrid controller 138 also communicates with the AC/DC converter 112 and can operate to control the quantity of power flow and the direction of power flow between the AC bus 108 and the DC bus 110.

The microgrid controller 138 may also operate to control the dispatching of power to select the desired power sources to achieve a goal. For example, the microgrid controller 138 could operate to maximize the use of power from green energy sources when it is available to power the AC loads 124 and the DC loads 136 while also storing any excess power. When green power is not available, the microgrid controller 138 could operate to use stored energy before initiating operation of non-green power sources.

In operation, the microgrid controller 138 determines the total load required by the AC loads 124 and the DC loads 136 and selects the power generation sources to provide at least that load. Specifically, the microgrid controller 138 may operate to first dispatch the green power sources, whether AC or DC to provide the necessary power to the AC loads 124 and the DC loads 136. If there is excess green power available, the microgrid controller 138 may initiate operation of one or more of the various energy storage systems to store that power. If the green power is not sufficient to support the AC loads 124 and the DC loads 136 the microgrid controller 138 determines which power source or sources to use to deliver the additional power. The microgrid controller 138 may initiate additional non-green power generators such as the combustion turbines 118, may utilize energy stored in one of the AC energy storage systems 122, the batteries 128, the ultracapacitors 130, and/or the DC energy storage systems 132.

Under some conditions, the power generation capacity of the microgrid 100 may exceed the AC loads 124, the DC loads 136, and the energy storage capacity of the microgrid 100. In these situations, energy production can be reduced.

Before proceeding, it should be noted that terms such as systems, loads, subsystems, and the like are interchangeable. Typically, a subsystem is part of a system or a load, however, subsystems can themselves be loads or systems as well.

Figure 2:
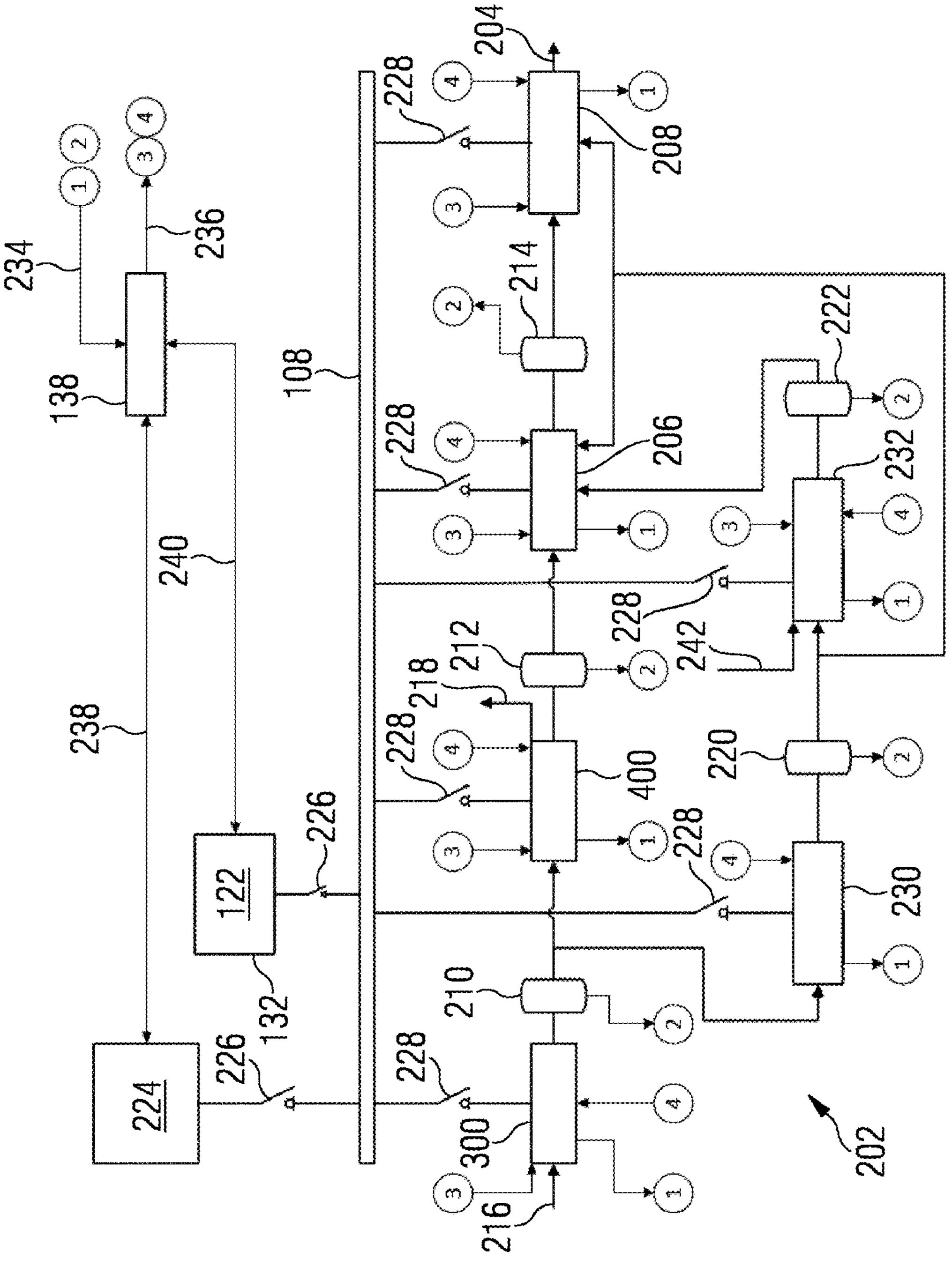
FIG. 2 is a schematic illustration of a portion of the microgrid of FIG. 1 including additional details.

FIG. 2 schematically illustrates a specific portion of the microgrid 100 of FIG. 1. The arrangement of FIG. 2 is intended to utilize only green power sources 224 to power a production system 202 that operates to produce a final output product 204. The arrangement of FIG. 2 includes a microgrid controller 138 that operates to control the production system 202, the green power sources 224, any AC energy storage systems 122, and any DC energy storage systems 132 to operate the production system 202 using only green energy such that the final output product 204 is deemed "green". As used herein, a "green power source 224" is a power source that operates using only renewable inputs to drive the energy source. Examples of green power sources 224 include but are not limited to, wind power, geothermal, hydroelectric, solar power, biomass, fuel cells, gas turbines (combusting green fuels), nuclear power, and the like. Similarly, the term "deemed green" refers to products made from processes that are powered by green power sources 224. In some cases, being deemed green requires that at least 90% of the power used to power the process is generated by green power sources 224, with other designations requiring different percentages.

In some constructions, the microgrid controller 138 assigns a green coefficient to each of the power sources and uses that coefficient to dispatch the various power sources. The green coefficient can be as simple as a binary choice such as "is green" and "is not green". However, other arrangements may have more varied choices for green coefficients. For example, a gas turbine that operates on a mixed fuel of green methane or hydrogen and a non-green fuel may have a value between green and not green. For example, a green source may have a value of one, a non-green source may be a zero, while a variable source such as the one just described may have a green coefficient of one-half. Of course, other arrangements or methods may be used to identify power sources as green or not green.

As discussed with regard to FIG. 1, the green power sources 224, which are a subset of the AC electrical generators 120 and the DC electrical generators 134 of FIG. 1 are connected to the AC bus 108 (or the DC bus 110) via a controllable input switch 226 to provide useable electricity. Similarly, the AC energy storage systems 122 and the DC energy storage systems 132 are connected to the AC bus 108 (or the DC bus 110) via a controllable input switch 226 to provide useable electricity. Power generation communication links 238 and power storage communication links 240 extend between the green power sources 224 and the microgrid controller 138 and between the AC energy storage systems 122, DC energy storage systems 132, and the microgrid controller 138 to allow the microgrid controller 138 to control the operation of the green power sources 224, the AC energy storage systems 122, and the DC energy storage systems 132. The power generation communication links 238 and the power storage communication links 240 provide two-way communication such that in addition to the aforementioned control signals, sensor signals can be transmitted to the microgrid controller 138 to allow for monitoring and control. Thus, during operation, the microgrid controller 138 is able to measure a quantity of power delivered to the microgrid from the various energy sources. It should be noted that the power generation communication links 238 and the power storage communication links 240 can be wired connections, wireless connections, or any combination thereof as may be desired.

The production system 202 operates to draw a quantity of power from the microgrid 100 to convert input materials into the final output product 204. This quantity of power drawn from the microgrid 100 is periodically compared to the quantity of power delivered to the microgrid 100 to keep the microgrid 100 in balance. If the comparison shows too much power is being drawn by the production system 202, the microgrid controller 138 will operate to increase the power delivered to the microgrid 100 or will reduce the quantity of power drawn from the microgrid 100. One of the goals of the present system is to produce the product using only green energy or at least a sufficient percentage of green energy to deem the final output product 204 as a green product. As will be discussed below, the microgrid controller 138 operates to achieve this goal by first selecting only green sources of power (i.e., sources of power with high green coefficients).

The production system 202 can be virtually any system capable of producing any product. While FIG. 2 will be described as a specific system, it should be understood that the example is provided for clarity and the production system 202 should not be limited to this arrangement alone. Additionally, while the production system 202 is illustrated as producing a final output product 204 in the form of gasoline, other products produced as part of the process could be the ultimate final output product 204 in other arrangements. Therefore, the production system 202 should not be limited to systems that produce a final output product 204 in the form of gasoline.

Typically, a production system 202 can be divided into a number of loads with each load including subsystems therein. The production system 202 includes a first load in the form of a demineralized water plant 300, a second load in the form of an electrolyzer 400, a third load in the form of a methanol synthesis plant 206, a fourth load in the form of a methanol to gasoline plant 208, a fifth load in the form of an electrical steam generator 230, and a sixth load in the form of a direct air capture plant 232. Each of the loads is selectively connected to the AC bus 108 via an output switch 228. Each output switch 228 is separately controllable to allow the microgrid controller 138 to selectively separate one or more of the loads from the AC bus 108 as may be required.

An input material in the form of raw water 216 is directed to the demineralized water plant 300 at the start of the production system 202. As will be discussed in greater detail with regard to FIG. 3, the demineralized water plant 300 includes a number of subsystems that operate to convert the raw water into demineralized water with many of these subsystems consuming power during operation. In the illustrated arrangement, the demineralized water is delivered to a demineralized water storage tank 210 following passage through the demineralized water plant 300. It should be noted that one or more tanks could be employed for the storage of the water. These tanks can be open tanks (i.e., unpressurized), closed pressurized tanks, or a combination thereof. It should also be noted that the term "tank" as used herein refers to a storage device capable of storing the desired medium under the desired conditions, thereby acting as a buffer. In many cases, these will be conventional tanks. However, some media or some storage conditions may better utilize storage containers that, while referred to as tanks, are not necessarily tanks as that word might normally be used.

A portion of the demineralized water is directed to the electrolyzer 400 with a second portion of the demineralized water being delivered to the electrical steam generator 230. Each of the electrolyzer 400 and the electrical steam generator 230 include subsystems that consume electrical power and use the demineralized water to produce an output product. In the case of the electrolyzer 400, the subsystems (discussed in greater detail with regard to FIG. 4) operate in response to the receipt of electrical power to produce an output product in the form of hydrogen, with a waste stream of oxygen 218 being produced as well. The hydrogen is delivered to a hydrogen tank 212 for storage and future use. The hydrogen may be refrigerated and/or pressurized for storage in the hydrogen tank 212 as may be desired.

The electrical steam generator 230 includes subsystems that operate in response to the receipt of electrical power to heat the demineralized water to produce steam. The electrical steam generator 230 electrically heats the water without any combustion, thereby maintaining the green nature of the production system 202. However, other constructions may employ a combustion process that utilizes a green fuel to produce the steam. The produced steam is fed to a steam tank 220 or other steam storage or buffering system following production.

A portion of the steam is directed to the direct air capture plant 232 which also receives a flow of air 242 as well as electrical power and operates to extract carbon dioxide from the air 242. The direct air capture plant 232 includes subsystems that operate to produce an output in the form of carbon dioxide. The carbon dioxide is directed to a carbon dioxide tank 222 in which the carbon dioxide is stored for future use. Again, the carbon dioxide may be chilled and/or compressed for storage in the carbon dioxide tank 222. As will be discussed, portions of the steam are also directed to the methanol synthesis plant 206 and the methanol to gasoline plant 208.

The methanol synthesis plant 206 includes subsystems that receive as inputs electrical power from the AC bus 108, hydrogen from the hydrogen tank 212, carbon dioxide from the carbon dioxide tank 222, and steam from the steam tank 220, and use those inputs to produce an output product in the form of methanol. The methanol is directed to a methanol tank 214 for storage. In some constructions, the methanol is chilled and/or pressurized for storage in the methanol tank 214.

The methanol to gasoline plant 208 receives as inputs, electrical power from the AC bus 108, steam from the steam tank 220, and methanol from the methanol tank 214. The methanol to gasoline plant 208 includes subsystems that operate to use the various inputs to produce the final output product 204 in the form of gasoline. The gasoline may be directed to a pipeline for distribution and/or to various storage facilities for collection and eventual distribution and use.

Each of the tanks 210, 212, 214, 220, and 222, are optional and can be omitted if desired. In addition, while the tanks 210, 212, 214, 220, and 222 are described as storing products, in some cases the storage period may be very short and essentially zero. For example, if one of the loads requires 100% of the product produced by an upstream load, that production simply passes through the tank as it travels to the downstream load. Nevertheless, the tanks 210, 212, 214, 220, and 222 may be provided to provide a buffer to simply store extra production or fill in for periods of underproduction as will be discussed.

Figure 3:
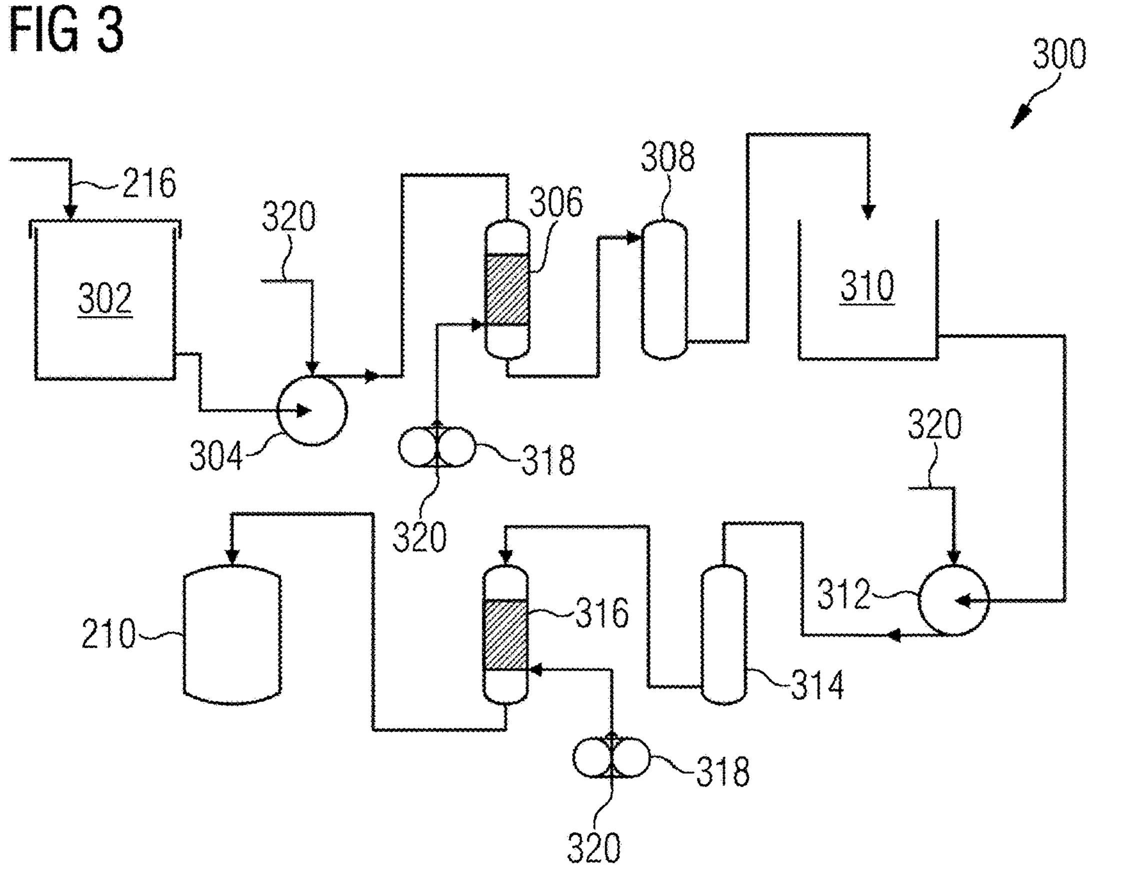
FIG. 3 is a schematic illustration of a demineralized water plant operable to produce demineralized water.

FIG. 3 is a simplified schematic of the demineralized water plant 300 better illustrating some of the possible subsystems. As shown, the raw water 216 enters the demineralized water plant 300 and is collected in a raw water tank 302. A first pump 304 operates in response to the receipt of electrical power 320 to deliver raw water 216 to a first filter 306 where it is filtered. The water is then delivered to a cation bed 308 that performs a first treatment on the water. The water may then be delivered to a degasser 310 or settling tank before a second pump 312 operates in response to the receipt of electrical power 320 to pump the water into an anion bed 314 for further treatment, through a second filter 316 and ultimately into the demineralized water storage tank 210. Each of the first filter 306 and the second filter 316 may include an air blower 318 that operates to blow air or another gas into the respective filters to backwash any filter media within the filters.

Thus, the multiple components of the demineralized water plant 300 and in particular, those that include components that receive electrical power 320 can be considered subsystems of the demineralized water plant 300. It should be noted that the demineralized water plant 300 illustrated in FIG. 3 is greatly simplified and is provided simply to illustrate some possible subsystems within the demineralized water plant 300. Of course, some of these subsystems could be eliminated and additional subsystems could be included in the demineralized water plant 300.

Figure 4:
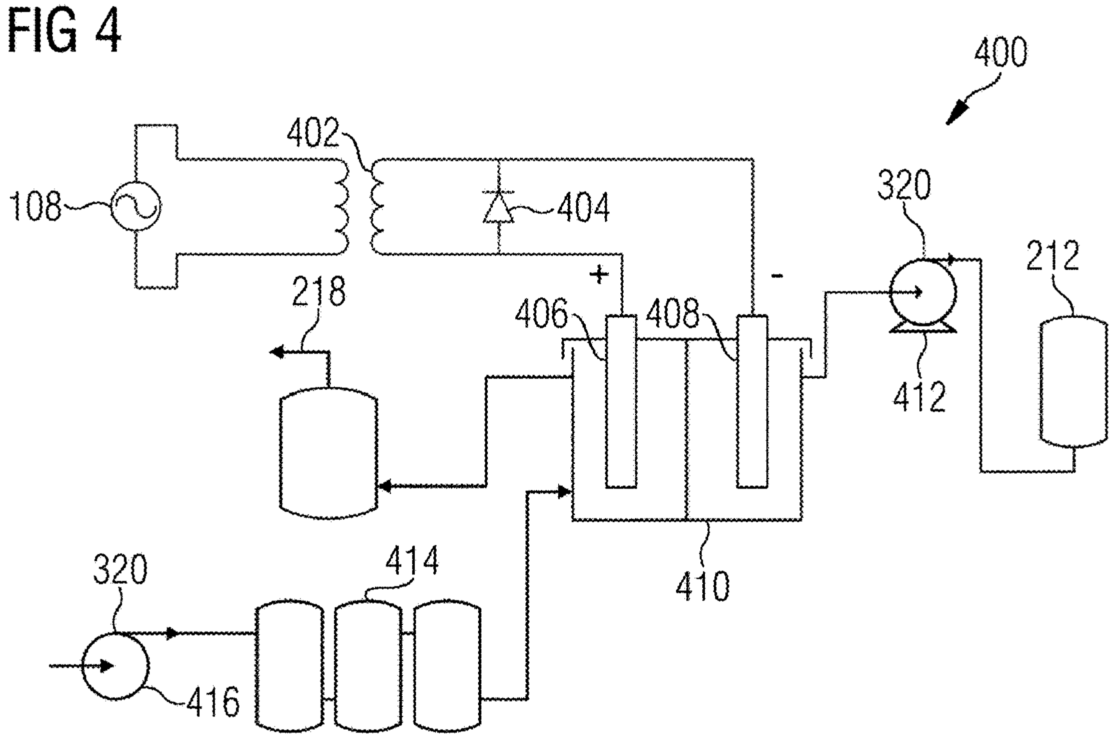
FIG. 4 is a schematic illustration of an electrolyzer operable to produce hydrogen from the demineralized water from the demineralized water plant of FIG. 3.
Figure 5:
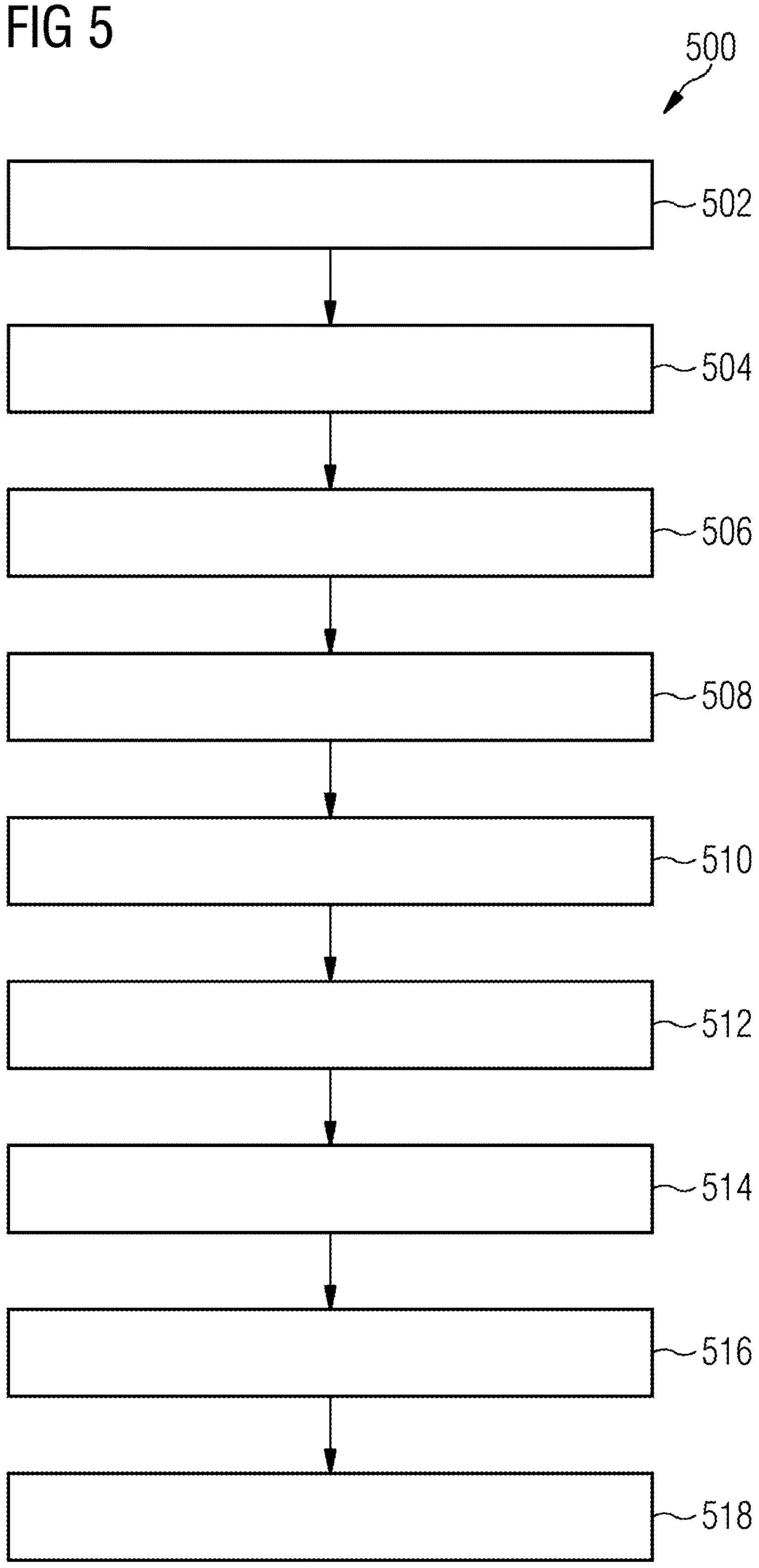
FIG. 5 is a flowchart illustrating operation of a microgrid controller during a load shedding process.

FIG. 4 is a simplified schematic of an arrangement of an electrolyzer 400 better illustrating some of the possible subsystems. As shown, electrical power is provided from the AC bus 108 and may be delivered to an electrolyzer transformer 402 to adjust the current and/or voltage of the AC power. A rectifier 404 is provided to convert the AC power to a direct current for delivery to one or more electrolyzer units 410. As an alternative, DC power can be delivered directly from the DC bus 110, thereby eliminating the need for the rectifier 404.

The electrolyzer unit 410 includes a tank or vessel that is filled with an electrolyte (i.e., saltwater) and contains a cathode 406 and an anode 408. During the electrolysis process, electrical power separates the water within the electrolyzer unit 410 into hydrogen and oxygen. The hydrogen is collected using a hydrogen compressor 412 that operates in response to the receipt of electrical power 320 to compress the hydrogen for storage in the hydrogen tank 212. While not illustrated, a hydrogen refrigeration system may also be employed to cool or liquefy the hydrogen for more efficient storage. The oxygen 218 may be collected and stored for future use or may simply be discharged into the atmosphere.

The electrolysis process consumes water, thereby requiring a replenishment subsystem. As illustrated in FIG. 4, a water pump 416 operates in response to the receipt of electrical power 320 to pump demineralized water from the demineralized water storage tank 210 to a water purifier 414. The water purifier 414 may include additional filters, water treatment devices, or salt systems that condition the water for delivery into the electrolyzer unit 410.

Thus, the multiple components of the electrolyzer 400 and in particular, those that include components that receive electrical power 320 can be considered subsystems of the electrolyzer 400. It should be noted that the electrolyzer 400 illustrated in FIG. 4 is greatly simplified and is provided simply to illustrate some possible subsystems within the electrolyzer 400. Of course, some of these subsystems could be eliminated and additional subsystems could be included in the electrolyzer 400.

FIG. 3 and FIG. 4 as well as the descriptions of the demineralized water plant 300 and the electrolyzer 400 are provided as examples of subsystems within these larger loads or systems. It should be understood that each of the methanol synthesis plant 206, the methanol to gasoline plant 208, the electrical steam generator 230, and the direct air capture plant 232 may include subsystems similar to those described with regard to FIG. 3 and FIG. 4. The description of these subsystems has been omitted for the sake of brevity.

As discussed, the microgrid controller 138 operates to periodically compare the quantity of power delivered to the microgrid and the quantity of power drawn from the microgrid to maintain a balance therebetween. If the power becomes unbalanced, the microgrid 100 may become unstable and the voltage or frequency may vary an unacceptable amount from the desired values. In particular, if the power becomes unbalanced, the frequency of the microgrid 100 may vary from the desired value.

Instability is particularly concerning when rapidly varying loads are attached to the microgrid 100 or when the electrical generators, and in particular the green power sources 224 are volatile or highly variable. For example, wind turbines are susceptible to changes in wind speed such that the power generated, and importantly the maximum power available from the wind turbines varies and is unpredictable. Similarly, solar power is reliant upon sunshine. If the level of sunshine suddenly changes (e.g., a cloud forms), the level of power generated by the PV solar generator 126 or the concentrated solar generator 116 would drop.

To compensate for this instability, the microgrid 100 could include excess generation or could limit the loads attached to the microgrid 100. However, this is inefficient. In addition, less volatile power supplies including non-green sources could be included in the microgrid 100. However, the use of these generators would result in a non-green final output product 204.

An alternative to the aforementioned options is to provide the microgrid controller 138 with a plant coordination system that balances the power in the microgrid 100 by controlling the quantity of power drawn from the microgrid 100 when additional power, and in particular additional green power or power from stored energy sources cannot be used to increase the quantity of power delivered to the microgrid. This is particularly important when it is desired to use only green power in a particular system or arrangement.

The quantity of power drawn from the microgrid 100 is controlled by implementing a load shedding process that is implemented following a series of escalation levels. To implement the load shedding process, the microgrid controller 138 calculates or stores precalculated values for an automation level and a production change capability for each load and in some cases various subsystems for the loads.

"Automation level" refers to a degree of automation of a load, system, or subsystem. Loads, systems, or subsystems that require operator intervention or a number of manual tasks in order to start, stop or change states would have a low automation level. In contrast, loads, systems, or subsystems that automatically start, stop, or change operation with little to no user intervention would have a high automation level.

"Production change capability" refers to the speed or time required for a load, system, or subsystem to transition between operational setpoints as well as the variation between minimum and maximum set points. For example, a load, system, or subsystem that can change operational setpoints rapidly as compared to other loads, systems, or subsystems (e.g., 5% per minute) would have a high production change capability. In contrast, a load, system, or subsystem that is limited to slow operational changes (e.g., 10% per hour) would have a lower production change capability. Similarly, the range of these operational changes also affects the production change capability. For example, two loads, systems, or subsystems that are both capable of changing setpoints at the same rate may still have different production change capabilities if one load, system, or subsystem can operate in a range from 20% load to 100% while the other load, system, or subsystem only operates from 70% to 100%. The larger range would lead to a higher production change capability.

When the microgrid controller 138 determines that a reduction in the quantity of power drawn from the microgrid 100 is required (i.e., additional power cannot be added to the microgrid 100), the microgrid controller 138 follows a series of steps. First, the microgrid controller 138 determines if the power reduction can be achieved by reducing the operational setpoints of one or more of the loads to achieve part-load operation of those loads. In making this selection, the microgrid controller 138 balances the load reduction with the output level of the final output product 204 to maximize the quantity of the final output product 204 produced while still operating one or more loads at part load.

If reducing the operational setpoints is not sufficient to achieve the necessary power consumption reduction, the microgrid controller 138 next reduces the setpoints and therefore the electrical consumption of one or more subsystems within the loads.

If the reduction of certain subsystems is also not sufficient to achieve the necessary power consumption reduction, the microgrid controller 138 next transitions one or more subsystems into a standby mode and ultimately, if this is unsuccessful the microgrid controller 138 will shut down selected loads, systems, or subsystems. For example, operation of the air blowers 318 of the demineralized water plant 300 could be reduced or stopped to reduce the use of electrical power 320 without reducing the output of the demineralized water plant 300.

To make the aforementioned reductions in setpoints of the loads or subsystems, or the transition to standby or ultimate shutdown of loads, systems, or subsystems, the microgrid controller 138 relies at least in part on the values of the automation level and the production change capability. For example, when reducing setpoints for loads or subsystems, the microgrid controller 138 reduces systems with a high automation level and with a high production change capability. These setpoint changes can be done seamlessly and automatically and because the loads or subsystems have a high production change capability, they are more likely to allow for quick and large setpoint changes without adversely affecting the operation of the system.

Similarly, when transitioning a load or subsystem to standby, or shutting down a load or subsystem, the microgrid controller 138 will select those loads and subsystems that have the highest automation level and that have the highest production change capability. The high automation level is particularly important when transitioning to standby or shutting down a load or subsystem as it is indicative of the difficulties involved in completing the shutdown as well as initiating a startup. For example, stopping operation of the water pump 416 in the electrolyzer 400 does not require any significant operational steps. However, shutting down a methanol synthesis plant 206 may require the purging of fuel lines and other components to remove any residual methanol. Therefore, the automation level of the electrolyzer 400 would be lower than the automation level of the water pump 416.

In block 502, a method of operating a microgrid 500 includes operating one of a plurality of power sources to deliver power to the microgrid. In block 504, the method of operating a microgrid 500 includes measuring a quantity of power delivered to the microgrid. In block 506, the method of operating a microgrid 500 includes drawing power from the microgrid to power one of a plurality of loads, each load including a plurality of separately operable subsystems. In block 508, the method of operating a microgrid 500 calculates an automation level and a production change capability for each load and subsystem of the plurality of subsystems. In block 510, the method of operating a microgrid 500 measures a quantity of power drawn from the microgrid. In block 512, the method of operating a microgrid 500 reduces the quantity of power drawn from the microgrid in response to a measured quantity of power drawn exceeding a measured quantity of power provided. The reducing step follows a sequence of reductions which includes the following. In block 514, the method of operating a microgrid 500 reduces an operating level of a first load of the plurality of loads. In block 516, the method of operating a microgrid 500 determines if the reduction in operating level was sufficient to reduce the measured quantity of power drawn from the microgrid to a point at or below the measured quantity of power provided. In block 518, the method of operating a microgrid 500 limits the power consumption of a first subsystem below the reduced operating level in response to the determining step concluding the reducing step did not sufficiently reduce the quantity of power drawn from the microgrid, the first subsystem selected based in part on the calculated automation level and the production change capability.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

The invention claimed is:

1. A method of operating a microgrid, the method comprising:
- operating one of a plurality of power sources to deliver power to the microgrid;
- measuring a quantity of power delivered to the microgrid;
- drawing power from the microgrid to power one of a plurality of loads, each load including a plurality of separately operable subsystems;
- calculating an automation level and a production change capability for each load and subsystem of the plurality of subsystems;
- measuring a quantity of power drawn from the microgrid; and
- reducing the quantity of power drawn from the microgrid in response to a measured quantity of power drawn exceeding a measured quantity of power provided, the reducing step following a sequence of reductions which includes:
  - reducing an operating level of a first load of the plurality of loads;
  - determining that the reduction in operating level was insufficient to reduce the measured quantity of power drawn from the microgrid to a point at or below the measured quantity of power provided; and
  - limiting a power consumption of a first subsystem below the reduced operating level in response to the determining step concluding the reducing step did not sufficiently reduce the quantity of power drawn from the microgrid, the first subsystem selected based in part on the calculated automation level and the production change capability.

2. The method of claim 1, further comprising further determining that the limiting step failed to reduce the measured quantity of power drawn from the microgrid to the point at or below the measured quantity of power provided; and transitioning one of the first subsystem and a second subsystem to a standby mode, the first subsystem and the second subsystem selected based in part on the calculated automation level and the production change capability.

3. The method of claim 2, further comprising additionally determining that the transitioning step failed to reduce the measured quantity of power drawn from the microgrid to the point at or below the measured quantity of power provided; and shutting down operation of one of the first subsystem, the second subsystem, and a third subsystem, the first subsystem, the second subsystem, and the third subsystem selected based in part on the calculated automation level and the production change capability.

4. The method of claim 1, further comprising determining a green coefficient for each power source of the plurality of power sources and increasing a first quantity of power delivered to the microgrid from a first power source, the first power source selected in part based on the green coefficient.

5. The method of claim 1, further comprising operating a first load of the plurality of loads to produce a first product, storing the first product in a first buffer, delivering the first product from the first buffer to a second load of the plurality of loads, operating the second load to produce a second product in response to a receipt of the first product.

6. The method of claim 5, further comprising operating the first load and the second load at a first load point at which a first quantity of the first product produced by the first load equals a second quantity of the first product required by the second load.

7. The method of claim 6, further comprising reducing the power consumed by the first load from the first load point to a second load point while maintaining the power consumed by the second load at the first point, the second load receiving a portion of the first product from the first load and a second portion of the first product from the first buffer.

8. The method of claim 5, wherein the first load is one of a demineralized water plant, an electrolyzer, a direct air capture plant, and a methanol synthesis plant and the second load is one of the electrolyzer, a direct air capture plant, the methanol synthesis plant, and a methanol to gasoline plant.

9. The method of claim 5, wherein the first buffer is one of a demineralized water tank, a steam tank, a hydrogen tank, a CO2 tank and a methanol tank.

10. The method of claim 1, further comprising a microgrid controller operable to control each of the plurality of power sources and the plurality of loads.

11. The method of claim 1, wherein the plurality of power sources comprises at least one of a wind park, a concentrated solar generator, and/or a combustion turbine connected to a AC bus, with each operable to deliver power to the AC bus.

12. The method of claim 1, wherein the automation level is a degree of automation of a load or subsystem.

13. The method of claim 1, wherein the production change capability is a speed or time required for a load or subsystem to transition between operational setpoints as well as a variation between minimum and maximum set points.

* * * * *